(12) United States Patent
Montgomery

(10) Patent No.: US 12,710,931 B2
(45) Date of Patent: Aug. 18, 2026

(54) CONTINUOUS TRANSFORMATION FRAMEWORK SYNTAX

(71) Applicant: Xano, Inc., Wooland Hills, CA (US)

(72) Inventor: Sean Montgomery, Woodland Hills, CA (US)

(73) Assignee: Xano, Inc., Woodland Hills, CA (US)

( * ) Notice: Subject to any disclaimer, the term of this patent is extended or adjusted under 35 U.S.C. 154(b) by 348 days.

(21) Appl. No.: 18/517,395

(22) Filed: Nov. 22, 2023

(65) Prior Publication Data

US 2025/0165229 A1 May 22, 2025

(51) Int. Cl.
*G06F 8/30* (2018.01)

(52) U.S. Cl.
CPC .................................... *G06F 8/31* (2013.01)

(58) Field of Classification Search
CPC ........................................................ G06F 8/31
USPC ................................ 717/110–117, 141–144
See application file for complete search history.

(56) References Cited

U.S. PATENT DOCUMENTS 8,943,095 B2 1/2015 Gorman et al.
9,083,374 B2 * 7/2015 Marpe .................... H03M 7/00
9,258,225 B2 * 2/2016 Hill ..................... H04L 63/0245
10,872,095 B2 * 12/2020 Horowitz .......... G06F 16/24556
11,354,305 B2 * 6/2022 Malak ..................... G06F 16/26
12,073,457 B1 8/2024 Bowman et al.
2025/0165250 A1 5/2025 Montgomery

OTHER PUBLICATIONS

Stack Overflow, "Regex101 vs JavaScript String.match disagreement", 2017, retrieved from http://stackoverflow.com:80/questions/28920384/regex101-vs-javascript-string-match-disagreement/ , 2 pages. (Year: 2017).*

Haverbeke, "Eloquent JavaScript", Chapter 9: Regular Expression, 3rd edition 2018, Retrieve from https://eloquentjavascript.net/3rd_edition/Eloquent_JavaScript.pdf, pp. i-x, 143-166. (Year: 2018).*

"U.S. Appl. No. 18/623,606, Non Final Office Action mailed Feb. 13, 2026", 12 pgs.

* cited by examiner

*Primary Examiner* — Ted T. Vo
(74) *Attorney, Agent, or Firm* — Schwegman Lundberg & Woessner, P.A.

(57) ABSTRACT

Methods, systems, and computer programs are presented for the use of a syntax framework for data transformation. A Continuous Transformation Framework (CTF) Syntax is presented that supports chainable actions that allow for continuous transformations on the original data. The CTF syntax closely resembles natural language, improves readability so code is easier to understand and read, reduces or eliminates the need for complex loops, and allows the easy traversal of arrays. The CTF framework's ability to return the original object in its transformed state enables continuous transformations and simplifies the overall process.

20 Claims, 13 Drawing Sheets

104
FILTER
VARIABLE NAME: DATA — 106
VALUE: {V:1,ITEMS:[{ID:2},{ID:3}]} — 108
EXPRESSION: $.DATA|@V=10|@ITEMS.0.ID=8 — 112
ADD FILTER — 110

Continuous Transformation Framework (CTF) Syntax

- Constants
  Treat an expression as text, unless it is numerical, Boolean, null, or an expression.

- Text with spaces
  Include spaces in string

- Text with quotes
  Include delimiter to identify quotes

- Variables
  Variables are references from the global \$ character.

```
value = 123
value2 = $.value + 1
```

FIG. 2

- Select with @ selector

The first character @ represents the start of the CTF syntax. The selector uses dot notation with the added bonus of traversing arrays Example:

```
variable "data" = {v:1,items:[{id:2},{id:3}]}

        $.data|@v                # 1
        $.data|@items            # [{id:2},{id:3}]
        $.data|@items.0.id       # 2
        $.data|@items.id         # [2,3]
```

FIG. 3

- Select + Transform

Format: @selector=

The first character @ represents the start of the CTF syntax.
The transformation expression can be wrapped with parentheses.

Example

```
variable "data" = {v:1,items:[{id:2},{id:3}]}

$.data|@v=10              # {v:10,items:[{id:2},{id:3}]}
$.data|@items=[]          # {v:1,items:[]}
$.data|@items.0.id=(8)    # {v:1,items:[{id:8},{id:3}]}
$.data|@items.id=(9)      # {v:1,items:[{id:9},{id:9}]}
```

FIG. 4

- Pipes

Pipes chain functions where the structure of the initial input is passed along the chain of functions and each function may access, transform, and select values inside the initial input.

Arguments to pipes are separated using a ":"

  ```
  "sean"|upper|at:0|lower # s
  ```

Arguments of pipes can be wrapped within parenthesis.

  ```
  "sean"|upper|at:(0|inc)|lower # e
  ```

- Nested conditional select allows the selection of data based on conditions. It can be used within a pipe chain.

Example: Retrieve all tags from a single array with an item > 95

  ```
  $.data|@items[$$.score>95].tags.tag
  ```

- Transformations return original data regardless where the transformation is taking place. This allows chaining.

Example variable "data" = {v:1,items:[{id:2},{id:3}]}

  ```
  $.data|@v=10|@items.0.id=8          # {v:10,items:[{id:8},{id:3}]}
  ```

FIG. 5

- Pipes can be used with regular functions

Example with variable “data” = {v:1,items:[{id:2},{id:3}]}

```
$.data|@v                # 1
$.data|@items.id|sum     # 5
$.data|@v=10             # {v:10,items:[{id:2},{id:3}]}
```

- Pipes can be used with a regular expression

Example with same variable “data”

```
$.data|@v=(10|add:1)+1*2     # {v:13,items:[{id:2},{id:3}]}
```

FIG. 6

- Special variable `$$` used to reference a selection
  `$n` accesses the nth element in the data structure (e.g., first element is `$0`, second is `$1`, etc.). `$$` is same as `$0`.

Example with variable “data” = {v:1,items:[{id:2},{id:3}]}

```
$.data|@v=10+1*2            # {v:12,items:[{id:2},{id:3}]}
$.data|@v=$$ + 10+1*2       # {v:13,items:[{id:2},{id:3}]}
      (in this examle $$ refers to v)
$.data|@items.id=10         # {v:1,items:[{id:10},{id:10}]}
$.data|@items.id=10*$$      # {v:1,items:[{id:20},{id:30}]}
      (in this example $$ refers to @items.id)
```

- Multiple selections may be used within one expression
  Example with variable “data” = {v:1,items:[{id:2},{id:3}]}

```
$.data|@v=$$+10             # {v:11,items:[{id:2},{id:3}]}
$.data|@v=$0+10             # {v:11,items:[{id:2},{id:3}]}
```

FIG. 7

- Selection of multiple elements can be performed by separating selectors with a comma (e.g., @selector1,@selector2,@selectorN=…)

Example with the variable “data” = {v:1,items:[{id:2},{id:3}]}

```
$.data|@,@items.id=$0.v+$1*10        #{v:1,items:[{id:21},{id:31}]}
$.data|@,@items.id=$0.v+$$*10        #{v:1,items:[{id:21},{id:31}]}

$.data|@,@items.id=($0.items|count)+$$*10
                                     #{v:1,items:[{id:22},{id:32}]}
```

FIG. 8

Complex Example variable “data” = {v:1,items:[{id:2,name:”a”},{id:3,name:”b”},{id:4,name:”c”}]}

Perform following operations:
- Increment v by 10
- Filter the items array to include items with an id greater than or equal to 3
- Upper case name entry of each item
- Transform the array into an array of objects of just name?

```
$.data?
    |@v=$$+10?
    |@items=$$|filter:$$.id >= 3?
    |@items.name=$$|upper?
    |@items=$$|pick:[“name”]

            # {v:11,items:[{name:”B”},{name:”C”}]}
```

FIG. 9

Complex multi-step transform example

```
var data =
        {v: 1, alias: "sean",
        items: [{id: 1, name: "apple", score: 90,
                        tags: [{tag:"brown",weight:10},{tag:"silver",weight:20}]},
                    {id: 2, name: "pear", score: 100,
                        tags: [{tag:"red",weight:30},{tag:"gold",weight:40}]}]}
```

Operations:

- Increment v by 10
- Filter the items array to include items if id >= 2
- Upper case name entry of each item
- Transform tags array into array of objects of tag uppercased if weight > 35

```
$.data
  @v=$$+10
  |@items=($$|filter:$$.id >= 2)
  |@items.name=($$|upper)
  |@items.tags=($$|filter:$$.weight>35|pick:["name"]|@name=($$|upper))
```

RECEIVE COMPUTER PROGRAM INSTRUCTIONS FOR EXECUTION BY A MACHINE, THE COMPUTER PROGRAM INSTRUCTIONS BEING DEFINED USING A PREDETERMINED SYNTAX, THE COMPUTER PROGRAM INSTRUCTIONS INCLUDING AT LEAST ONE PIPE OPERATION, WHEREIN THE PIPE OPERATION IN THE PREDETERMINED SYNTAX INCLUDES PASSING AN INPUT TO A FUNCTION AND THE FUNCTION RETURNING AN OUTPUT EQUAL TO A TRANSFORMATION OF THE INPUT PERFORMED BY THE FUNCTION, WHEREIN THE PREDETERMINED SYNTAX PROVIDES A CHARACTER SELECTOR TO IDENTIFY A FIELD IN THE INPUT TO TRANSFORM A VALUE OF THE FIELD IN THE INPUT, WHEREIN THE CHARACTER SELECTOR ENABLES IDENTIFYING THE FIELD IN THE INPUT WITHOUT USING A NAME OF THE INPUT — 1202

EXECUTING, BY THE MACHINE, THE COMPUTER PROGRAM INSTRUCTIONS — 1204

CAUSE PRESENTATION ON A COMPUTER DISPLAY OF A RESULT FROM EXECUTING THE COMPUTER PROGRAM INSTRUCTIONS. — 1206

FIG. 12

CONTINUOUS TRANSFORMATION FRAMEWORK SYNTAX

TECHNICAL FIELD

The subject matter disclosed herein generally relates to methods, systems, and machine-readable storage media for an improved programming syntax that is more compact, easy to read, and includes chainable actions.

BACKGROUND

Programming languages have continuously evolved over the last few decades. However, existing programming languages have complex syntaxes that allow only expert computer programmers to create, understand, and debug code. Other problems include the large number of lines needed to code tasks, the long time required to write code, difficulty in collaborating with other users who are not familiar with some blocks of code, difficulty in analyzing code to find bugs, etc.

BRIEF DESCRIPTION OF THE DRAWINGS

Various appended drawings illustrate examples of the present disclosure and cannot be considered limiting its scope.

FIG. 2 illustrates the Continuous Transformation Framework (CTF) syntax according to some examples.

FIG. 3 illustrates the use of the CTF selector according to some examples.

FIG. 4 illustrates the use of the CTF selector combined with a transformation, according to some examples.

FIG. 5 illustrates the syntax for pipes, according to some examples.

FIG. 6 illustrates the use of pipes with regular functions, according to some examples.

FIG. 7 illustrates the use of a special variable to reference items in a variable, according to some examples.

FIG. 8 illustrates the selection of multiple elements, according to some examples.

FIG. 9 illustrates a complex example that uses the CTF syntax, according to some examples.

FIG. 10 illustrates another complex example that uses a multi-step transform, according to some examples.

FIG. 12 is a flowchart of a method for the use of a syntax framework for data transformation, according to some examples.

DETAILED DESCRIPTION

Example methods, systems, and computer programs are directed to a syntax framework for data transformation that enhances readability and reduces complexity. Examples merely typify possible variations. Unless explicitly stated otherwise, components and functions are optional and may be combined or subdivided, and operations may vary in sequence or be combined or subdivided. In the following description, numerous specific details are set forth to provide a thorough understanding of examples. However, it will be evident to one skilled in the art that the present subject matter may be practiced without these specific details.

A Continuous Transformation Framework (CTF) Syntax is presented that supports chainable actions that allow for continuous transformations on the original data. The CTF syntax closely resembles natural language, improves readability so code is easier to understand and read, reduces or eliminates the need for complex loops, and allows the easy traversal of arrays. Further, the CTF syntax allows the presentation of more of the program's logic on a display, very helpful when viewing logic in devices with small displays, and also allows the easier editing of program code on smaller devices (e.g., mobile phones) because the CTF syntax requires less characters than traditional programming languages. The CTF framework's ability to return the original object in its transformed state enables continuous transformations and simplifies the overall process.

Figure 1A:
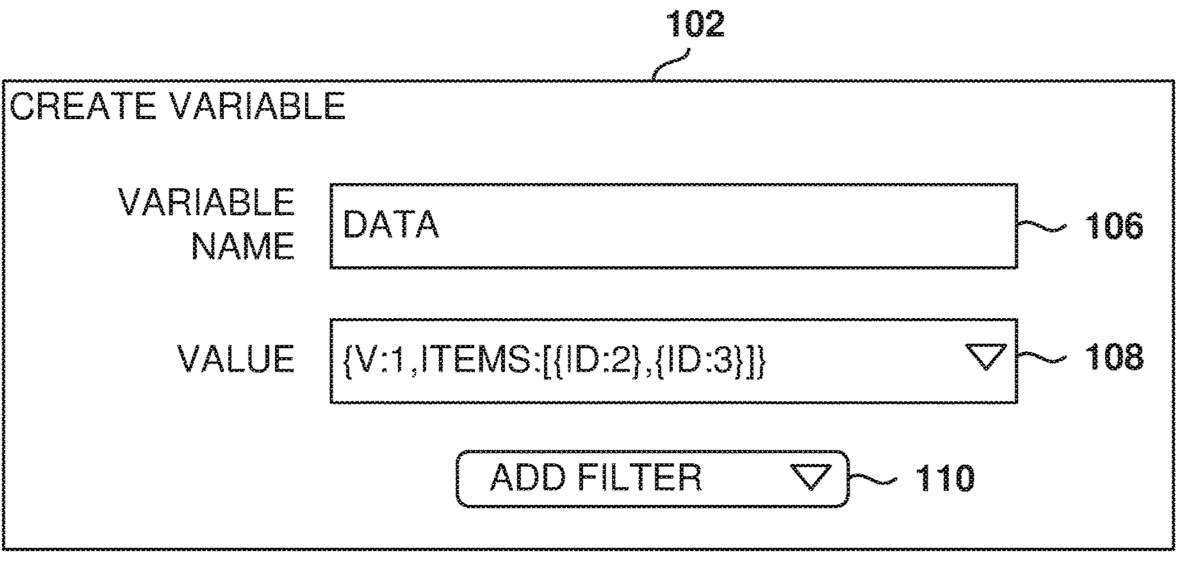
FIGS. 1A-1B show a sample user interface (UI) for generating code, according to some examples.
Figure 1B:
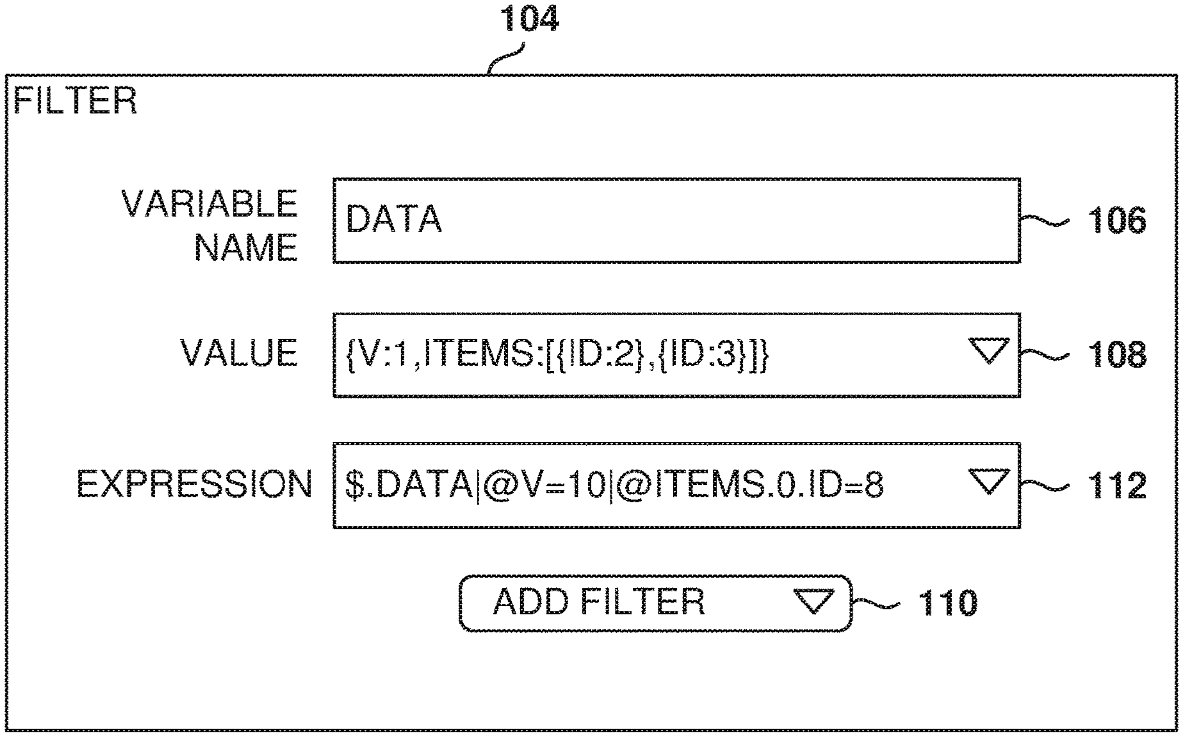

FIGS. 1A-1B show a sample user interface (UI) 102 for generating code, according to some examples. The UI 102 includes options for entering instructions to create CTF code. Instead of using a text editor to write code, a developer may use the UI 102 to enter information, such as variables, functions, transformations, etc.

Although the UI 102 is shown for a guided utility to create code, the CTF code may also be created with other tools, such as integrated development environments, text editors, etc. Additionally, the CTF code may be used for many purposes, such as for input to compilers to generate machine code, input for interpreters, use as a browser add-in, integration with another type of code (e.g., JavaScript), mobile app development, etc.

In the UI 102, the user has selected the option to create a variable. Field 106 is for entering the variable name, and field 108 is for entering a value for the variable. In the illustrated example, the user has created a variable named data, and the value for data, expressed in CTF format, is {v:1,items:[{id:2}, {id:3}]}. Thus, the variable data includes a first field v, and an array named items with two components, a first one with an id of 2 and a second one with an id of 3.

A menu 110 provides options to enter additional instructions. In this example, the user has selected to add a filter, and the result is shown in UI 104 of FIG. 1B. Field 112 has been added to enter an expression to access the variable data, and the expression is S.data|@v=10|@items.0.id=8. When the program is executed, the result of applying this expression to the variable data would be updating data to {v:10, items:[{id:8}, {id:3}]}. More details on the syntax for the CTF code are provided below, and this example is explained in more detail with reference to FIG. 3.

FIG. 2 illustrates the Continuous Transformation Framework (CTF) syntax, according to some examples. The CTF syntax is a new syntax that is easier to read and understand than existing programming syntaxes. Also, the CTF syntax is more compact, with savings of 50% or more in the number of characters required to program tasks as compared to existing syntaxes. The CTF syntax results in smaller files because less verbose code may result in less characters, which can decrease the time needed for file transfers, version control operations, and other file-related tasks. Further, more compact program instructions means that the instructions are easier to parse and can be processed faster.

Furthermore, the CTF syntax supports chainable actions, meaning that a pipe operation returns the original input root object in a transformed state so the original root object can be transformed again. More details on the implementation of pipes are provided below with reference to FIG. 4.

A programming syntax is a set of rules that define the structure of a programming language, acting as the grammar of the programming language and defining how instructions for the programming language should be provided so the compiler or interpreter can process the code to provide the desired result.

The CTF syntax provides the following benefits:

1. Easier to read and understand: with a more intuitive and natural language-like syntax, it becomes easier for developers to read and understand the code, making it less error-prone.
2. More compact code: the CTF syntax can help reduce the amount of code needed to accomplish a task, resulting in more concise and efficient programming.
3. Improved productivity: developers can write code faster, resulting in improved productivity and efficiency.
4. Better collaboration: with code easier to read and understand, it becomes easier for developers to collaborate and work together on a project.
5. Reduced complexity: the CTF syntax reduces the complexity of code, making it easier to maintain and update in the long run.
6. Better error handling: with a more intuitive syntax, it becomes easier to identify and fix errors in the code, reducing the time and effort required for debugging.
7. Improved performance: a more efficient syntax helps optimize the performance of the code, resulting in faster running programs.
8. Reduction in file sizes: more compact instructions result in smaller files, which require less storage in memory and can be transmitted faster over a network.

Elements of the CTF syntax are described below. Other elements of the CTF syntax not explicitly described below are the same as other programming languages, such as JavaScript. For example, the use of functions in JavaScript, such as alert, mul, console.log, setInterval, etc., may also be used with the CTF syntax.

The following syntax elements are described below: constants, text, variables, selection from data structure, pipes, transformations, use of special variables for selection, and multiple selections.

With reference to constants, the CTF syntax treats an expression as text unless it is numerical, Boolean, null, or an expression. This reduces the requirement of having to include quotation marks. Below are a few examples with explanations:

```
value = sean # assign the string "sean" to the variable value
value = "sean" # assign the string "sean" to the variable value
value = 123 # numerical - assign the integer 123 to the variable
  value
value = "123" # assign the string "123" to the variable value
value = true # boolean - assign the boolean true to the variable
  value
value = "true" # assign the boolean "true" to the variable value
value = false # boolean - assign the boolean false to the
  variable value
value = "false" # assign the string "false" to the variable value
value = null # null - assign null to the variable value
value = "null" # assign the string "null" to the variable value
```

For text with embedded spaces, include the spaces in the string. Below are examples for entering text with embedded spaces:

```
value = sean is here # assign the string "sean is here" to the
  variable value
value = "sean is here" # assign the string "sean is here" to the
  variable value
```

For text with embedded quotes, the delimiter "\" is included to identify the quotes. Below are examples for entering text with embedded quotes:

```
value = 'sean is here' # "'sean is here'"
value = sean is " here # "sean is \" here"
value = \"sean is here # "\"sean is here"
```

Variables are references from the $ character. Below is an example:

$$\text{value} = 123$$

$$\text{value2} = \$ \cdot \text{value} + 1$$

In this example, the variable value is assigned a value of 123. To reference the variable value, S.value is used, so in the second line, a variable value2 is assigned the value of variable value plus one.

A selection of data may be performed with the symbol @. Thus, for an integer variable sample, the value of sample is obtained with @sample. Here is another example to get the value of a variable v:

```
var data = {
  v: 1,
  alias: "sean",
  items: [{
  id: 1,
  name: "apple",
  score: 90,
  tags: [{tag:"brown",weight:10},{tag:"silver",weight:20}]
  }, {
  id: 2,
  name: "pear",
  score: 100,
  tags: [{tag:"red",weight:30},{tag:"gold",weight:40}]
  }]
}
```

The CTF instruction would be $.data|@v and the result is 1.

In JavaScript, the instruction would be return data.v.

FIG. 3 illustrates the use of the CTF selector according to some examples. To make a selection, the character "@" is used to indicate a selection. For example, given variable data={v:1,items:[{id:2}, {id:3}]}, to access field v within the data example shown above, @v is used. To access items, @items can be used, and it would return the vector [{id:2}, {id:3}].

Dot notation may be combined with the @ selector, so @items.id can be used. Dot notation, in general, is used to access the properties and methods of objects. It is a simple and concise way to navigate through complex data structures. To use dot notation, the name of the object followed by a period and then the name of the property or method is used to indicate the desired access. For example, if there is an object called person with a property called name, person.name will access the name property.

Here are more examples to access the variable data:

```
$.data|@v               # 1
$.data|@items           # [{id:2},{id:3}]
$.data|@items.0.id      # 2
$.data|@items.id        # [2,3]
```

FIG. 4 illustrates the use of the CTF selector combined with a transformation, according to some examples. Selection and transformation may be combined. Transformations return the original data regardless of where the transformation is taking place. This allows chaining.

Below are a few examples:

```
data = {v:1,items:[{id:2},{id:3}]}
$.data|@v=10                # {v:10,items:[{id:2},{id:3}]}
$.data|@items=[ ]           # {v:1,items:[ ]}
$.data|@items.0.id=(8)      # {v:1,items:[{id:8},{id:3}]}
$.data|@items.id=(9)        # {v:1,items:[{id:9},{id:9}]}
```

In the first example, @v selects the variable v and makes its value equal to 10. In the second example, the values of data.items are set to null or empty. In the third example, the first item within items is set to 8, and in the last example, all the items in items are set to 9.

FIG. 5 illustrates the syntax for pipes, according to some examples. Pipes chain functions where the structure of the initial input is passed along the chain of functions, and each function may access, transform, and select values inside the initial input. Pipes are able to be applied to identifiers or constants and can be chained together through the "|" character. Arguments to pipes are separated using the ":" character.

The first element in a chain of pipes is the input, which can be any variable, such as an array of items. The input is passed to a function that may access, transform, and select values from the initial input. For example, if the function sets a value within the input, the output from the function will be the initial input with the changed value. For example:

```
variable "data" = {v:1,items:[{id:2},{id:3}]}
$.data|@v=10 # result is {v:10,items:[{id:2},{id:3}]}
```

Here are a few examples of pipes using several functions and the separator ":".

```
"sean"|upper # SEAN
"sean"|upper|at:0 # S
"sean"|upper|at:0|lower # s
```

In the first example, sean input is passed to function upper that uppercases the input, so the result is "SEAN." In the second example, a new function at:0 is added to the chain to select the first element, and since the passed input is "SEAN," the result is the first character "S." In the third example, a new function lower is chained to lowercase the input, and the result is "s."

Further, arguments of pipes can be wrapped within parentheses. For example,

"sean"|upper|at:(0|inc)|lower #e

In this case, the argument 0 is incremented first because it is within parenthesis. Hence, the result of the chain is the second element of the input, after being uppercased and then lowercased, which is "e."

Nested conditional selection allows the selection of data within the pipe chain based on conditions. The condition is included within square brackets in the pipe. For example, retrieving all tags from a single array with an item >95 can be written as follows:

```
# Data definition
var data = {
  v: 1,
  alias: "sean",
  items: [{
    id: 1,
    name: "apple",
    score: 90,
    tags: [{tag:"brown",weight:10},{tag:"silver",weight:20}]
  }, {
    id: 2,
    name: "pear",
    score: 100,
    tags: [{tag:"red",weight:30},{tag:"gold",weight:40}]
  }]
}
# CTX syntax
$.data|@items[$$.score>95].tags.tag
# Result is transformed Data
["red","gold"]
```

Thus, the operation may be performed using a single-line chain with CTF. On the other hand, a program in JavaScript would be substantially longer, such as:

```
var result = [ ];
data.items.forEach((item) => {
    if (item.score > 95) {
      item.tags.forEach((tag) => {
        result.push(tag.tag);
      });
    }
});
return result;
```

Thus, pipes in CTF are different than pipes in other programming languages. For example, in JavaScript, Pipes chain together functions so that the output of one function is passed as the input to the next function. However, there is no correlation between the input and the input in a chain and the output beyond what the function is defined to produce as the output. For example, a function could take as input a text string and return as output the time of the day, which is unrelated to the input.

In some examples, the pipes in CTF do not produce outputs that are unrelated to the input; that is, the output of the CTF pipe is directly related to the input, and the structure of the output is equal to the structure of the input or equal to a transformation in the pipe of the structure of the input. The output of a CTF pipe is based on the input, where the output can be equal to the input, equal to the input after one or more values in the input are modified, equal to a selection of all or part of the input, or any combination thereof. That is, the structure of the output of the CTF pipe is equal to the structure of the input or equal to a structure that is equal to a modification of the structure of the input.

FIG. 6 illustrates the use of pipes with regular functions, according to some examples. Pipes can be used with other regular functions defined by computer languages, such as JavaScript.

For example, for the variable data={v:1,items:[{id:2}, {id:3}]}, the CTF expression S.data|@items.id sum will return a value of 5, which is the value of applying the sum to the elements of @items.id.

Pipes can also be used with other regular expression, such as mathematical expressions. For the same variable data, the expression S.data|@v=10+1*2, will return the data structure {v:12,items:[{id:2}, {id:3}]}.

FIG. 7 illustrates the use of a special variable $$ to reference items in a variable, according to some examples. The elements in a data structure with a list of elements can be selected using "$" plus the number of the element in the list using zero indexing. Thus, the first element is $0, the second is $1, etc. The special element $$ refers to the top selection; that is, $$ is equivalent to $0.

Therefore, fields within a data structure may be referenced without having to include the name of the field itself by using the special syntax with the $ sign to access elements of the input. This results in more compact code and not having to enter the names of variables or fields repeatedly. Also, the meaning of the Sn construct depends on where the construct is used, as the construct is associated with the element being accessed.

Here are a few examples:

```
data= {v:1,items:[{id:2},{id:3}]}.
$.data|@v=10+1*2            # {v:12,items:[{id:2},{id:3}]}
$.data|@v=$$+10+1*2         # {v:13,items:[{id:2},{id:3}]}
$.data|@items.id=10         # {v:1,items:[{id:10},{id:10}]}
$.data|@items.id=10*$$      # {v:1,items:[{id:20},{id:30}]}
```

In the first example, @v accesses the v field, and the equal sign indicates that this field is set to the expression (10+1*2), which is 12. Thus, the result is the complete variable data with v set to 12. In the second example, $$ means the first field, so v is set to the value of v plus 12. In the next example, @items.id is set to 10 (both items in the vector), and in the last example, items.id is set to $$ (which refers to the respective field within @items) times 10.

Types can be defined for variables, and common types include inputs, environment variables, and columns. If a type is used, then the type must follow the $ character followed by a colon and the name of that variable, such as:

```
input {
   int id
}
value = 123 + $input.id
```

In this example, the variable input is defined as an integer named id, and its content is referenced as $input.id.

Another example with variables named input, env, and col:

```
input = 123
env = 2
col = 3
value = $.input + $.env + $.col + 1
```

Thus, these variables are referenced as $.input, $.env, and $.col.

Further, multiple selections may be included in one expression. For example:

```
$.data|@v=$$+10          # {v:11,items:[{id:2},{id:3}]}
$.data|@v=$0+10          # {v:11,items:[{id:2},{id:3}]}
```

In the first case, v is set to the current value represented by $$ plus 10. In the second one, v is set to the current value represented by $0 plus 10.

FIG. 8 illustrates the selection of multiple elements, according to some examples. The selection of multiple elements (e.g., fields of the input) can be performed by separating selectors with a comma (e.g., @selector1, @selector2,@selectorN= . . . ). For example:

```
data = {v:1,items:[{id:2},{id:3}]}
$.data|@,@items.id=$0.v+$1*10                  # {v:1,items:[{id:21},{id:31}]}
$.data|@,@items.id=$0.v+$$*10                  # {v:1,items:[{id:21},{id:31}]}
$.data|@,@items.id=($0.items|count)+$$*10        #{v:1,items:
  [{id:22},{id:32}]}
```

The CTF syntax is similar to how the solution to a problem is described to a person. Also, the powerful primitives to handle arrays, including selection and transformation, simplify coding and many times eliminate the need for flow loops. The CTF syntax described herein helps in solving several technical problems in software development:

Verbosity: Older languages or frameworks often require developers to write lengthy code for simple operations. With the improved CTF syntax, the same operations can be achieved with fewer lines, making code more readable and maintainable.

Ambiguity: Ambiguous syntax can lead to misinterpretations by developers and unexpected behaviors in programs. Clearer syntax can reduce such ambiguities, making code behavior more predictable.

Error Proneness: Certain coding patterns can be prone to errors. The CTF syntax often introduces safer patterns and ways to express operations, reducing the risk of mistakes.

Inefficient Memory Management: The CTF programs require less space. Therefore, memory usage is reduced, which helps improve the operation of the computer system.

Poor Integration Capabilities: Improved syntax can offer better ways to integrate with other systems, libraries, or frameworks, making interoperability smoother.

Lack of Expressiveness: Older syntax might not be expressive enough to capture complex operations or patterns naturally. The CTF syntax can provide more expressive power, making code more intuitive.

Inefficient Iteration: Traditional loop structures might not be the most efficient way to iterate over modern data structures. The enhanced CTF syntax can introduce more efficient iteration constructs tailored for specific data types.

Hard-to-Debug Constructs: Some older coding constructs can be challenging to debug. The improved syntax might introduce more transparent constructs, making the debugging process more straightforward.

FIG. 9 illustrates a complex example that uses the CTF syntax, according to some examples. This example involves performing several operations on the input variable. In this example, the input is as follows:

```
"data" = {v:1,items:[{id:2,name:"a"},{id:3,name:"b"},
  {id:4,name:"c"}]}
```

The task is to perform the following operations: 1. increment v by 10; 2. filter the items array to include items with an id greater than or equal to 3; 3. upper case name entry of each item; and 4. transform the array items into an array of objects of just name. The CTF code would be as follows:

```
$.data
  |@v=$$+10
  |@items=$$|filter:$$.id >= 3
  |@items.name=$$|upper
  |@items=$$|pick:["name"]
```

Therefore, the first operation modifies one of the values of data, data.v, which is accessed as @v. The second operation does filtering, which is a transformation of the initial input data, and the result of the second operation would be {v:11,items:[{id:3, name: "b"}, {id:4, name: "c"}]}, that is, the first element in the array items has been filtered out or eliminated.

The third operation is an alteration of the values for items.name, and the output of the third operation would be {v:11,items:[{id:3,name: "B"}, {id:4, name: "C"}]}. Finally, the fourth operation accesses @items and uses the pick function to select a subset from the input so that the final output would be:

{v:11,items:[{name: "B"}, {name: "C"}]}

The pick( ) function in JavaScript is used to return a copy of an object that contains only the specified properties and is often used to filter out unwanted properties from an object or to create a subset of an object with only the properties that are needed. The pick( ) function takes two parameters: object—the object to be filtered; and keys—an array of strings, representing the names of the properties to be picked.

This example is an excellent example to show the continuous transformation property of the CTF pipes, where several functions can be piped together, and each function does a respective transformation. It should be noted that the present method allows for the manipulation of data systematically and efficiently, enabling complex transformations to be performed step-by-step, thereby enhancing the manageability of the overall process.

The next example is for a nested-select pipe. The input data has the following structure:

```
var data = {
  v: 1,
  alias: "sean",
  items: [{
    id: 1,
    name: "apple",
    score: 90,
    tags: [{tag:"brown",weight:10},{tag:"silver",weight:20}]
```

-continued

```
  }, {
    id: 2,
    name: "pear",
    score: 100,
    tags: [{tag:"red",weight:30},{tag:"gold",weight:40}]
  }]
}
```

The goal of the code is to retrieve all of the tags into a single array.

The CTF instruction and the result would be:

$.data|@items.tags.tag #["brown", "silver", "red", "gold"]

A sample JavaScript program would be much longer and require for loops, as follows:

```
var result = [ ];
data.items.forEach((item) => {
  item.tags.forEach((tag) => {
    result.push(tag.tag);
  });
});
return result;
```

FIG. 10 illustrates another complex example that uses a multi-step transform, according to some examples. This example involves performing several operations on the input variable. In this example, the input is as follows:

```
var data = {
  v: 1,
  alias: "sean",
  items: [{
    id: 1,
    name: "apple",
    score: 90,
    tags: [{tag:"brown",weight:10},{tag:"silver",weight:20}]
  }, {
    id: 2,
    name: "pear",
    score: 100,
    tags: [{tag:"red",weight:30},{tag:"gold",weight:40}]
  }]
}
```

The task is to perform the following operations: 1. increment v by 10; 2. filter the items array to include items if id greater than or equal to 2; 3. upper case name entry within items; 4. transform the tags array into an array of objects of just tag in uppercase if the weight is greater than 35. The CTF code would be as follows:

```
$.data
  @v=$$+10
  |@items=($$|filter:$$.id >= 2)
  |@items.name=($$|upper)
  |@items.tags=($$|filter:$$.weight>35|pick:["name"]|@name=($$|
    upper))
```

Therefore, the first operation increments v by ten, and $$ means the field v. The second operation includes two pipes, and the first function is to select items, and the second function is to filter items.id to select those that are greater than or equal to 2. The third line uppercases @items.name. Finally, the fourth line filters items greater than 35 and selects the tag objects.

The final output would be the modified data as follows:

```
var data = {
    v: 11,
  alias: "sean",
    items: [{
    id: 2,
    name: "PEAR",
    score: 211,
    tags: [{tag:"GOLD"}]
    }]
}
```

A sample JavaScript program would be much longer, such as the following example:

```
data.v = data.v + 10;
data.items = data.items.filter((item) => {
    return item.id >= 2;
});
data.items = data.items.map((item) => {
    item.name = item.name.toUpperCase( );
    item.tags = item.tags.filter((tag) => {
      return tag.weight > 35;
  });
    item.tags = item.tags.map((tag) => {
    return XanoPipe.pick(tag, ["name"]);
  });
    return item;
});
return data;
```

The next example is for adding values with a condition, which shows how this operation may be performed in just a simple pipe while it would take JavaScript the programming of for loops.

The task is to sum the scores of all items of input data that have a score greater than 10, where the input data is as follows:

```
var data = {
  v: 1,
  alias: "sean",
  items: [{
    id: 1,
    name: "apple",
    score: 90,
    tags: [{tag:"brown",weight:10},{tag:"silver",weight:20}]
  }, {
    id: 2,
    name: "pear",
    score: 100,
    tags: [{tag:"red",weight:30},{tag:"gold",weight:40}]
  }]
}
```

The CTF instruction would be:

$.data|@items [$$.score>10].score|sum

The result would be 190. A JavaScript program would include the for loop as follows:

```
var result = [ ];
data.items.forEach((item) => {
    if (item.score > 10) {
      result.push(item.score);
  }
});
return XanoPipe.sum(result);
```

The last example is for updating a field within the data structure (score) by multiplying its value by another field (id) within the same array and adding the value of another field (v). The input data is as follows:

```
var data = {
    v: 1,
  alias: "sean",
    items: [{
      id: 1,
      name: "apple",
      score: 90,
      tags: [{tag:"brown",weight:10},{tag:"silver",weight:20}]
    }, {
      id: 2,
      name: "pear",
      score: 100,
      tags: [{tag:"red",weight:30},{tag:"gold",weight:40}]
    }]
}
```

It is noted that ($2 or $$) or $1.score could be used for the CTF code. The sample CTF code would be as follows:

$.data|@,@items, @items.score=$1.score*$1.id+10+$0.v

The result would be:

```
var data = {
  v: 1,
  alias: "sean",
  items: [{
    id: 1,
    name: "apple",
    score: 101,
    tags: [{tag:"brown",weight:10},{tag:"silver",weight:20}]
  }, {
    id: 2,
    name: "pear",
    score: 211,
    tags: [{tag:"red",weight:30},{tag:"gold",weight:40}]
  }]
}
```

A sample JavaScript program would be much longer, such as:

```
data.items.forEach((item, itemIndex) => {
  item.score = item.score*item.id + 10 + data.v;
});
return data;
```

Figure 11:
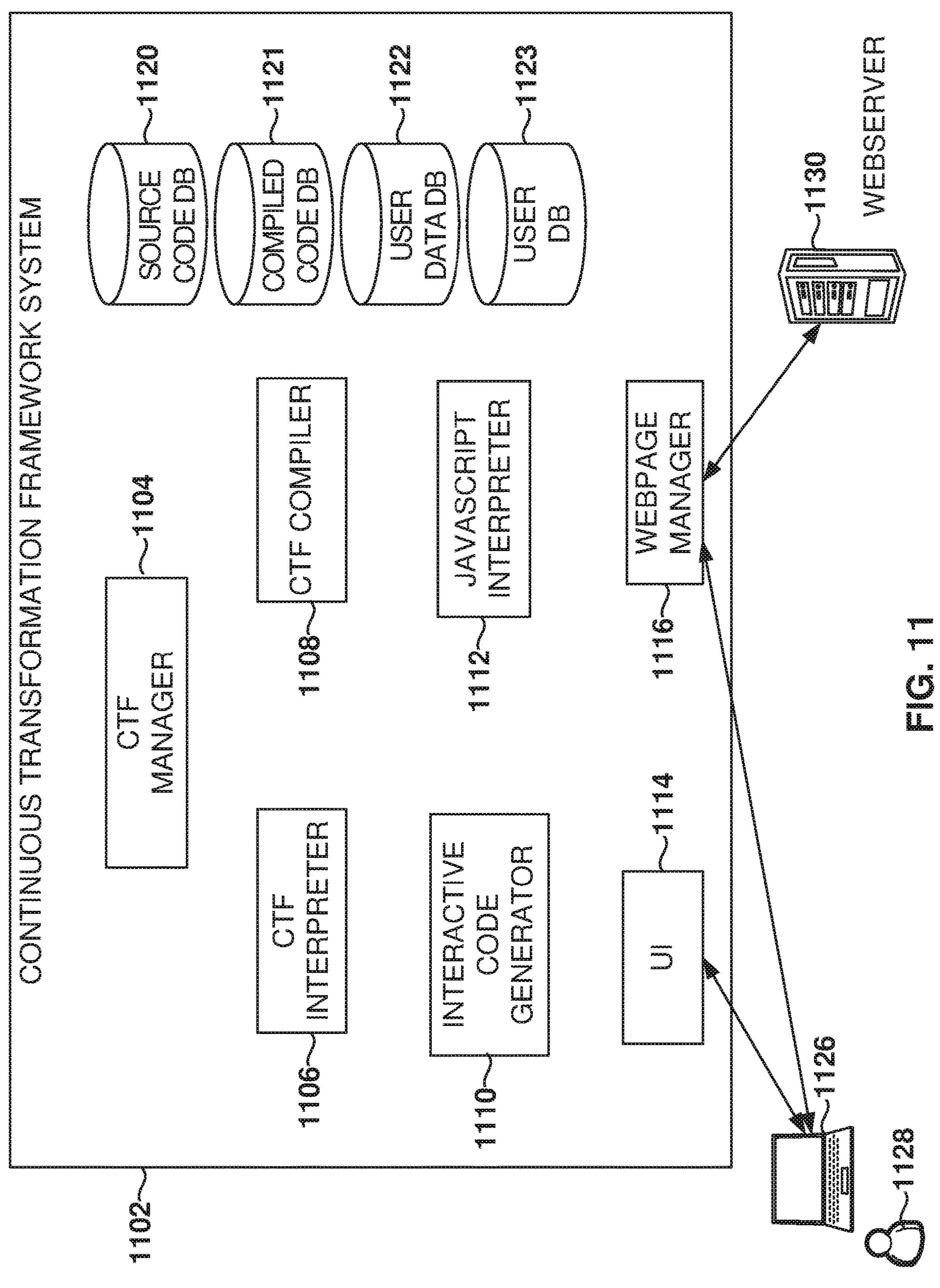
FIG. 11 is a simplified schematic diagram of a computer system for implementing the embodiments described herein.

FIG. 11 is a simplified schematic diagram of a computer system for implementing the examples described herein. The CTF system 1102 includes a CTF manager 1104, a CTF interpreter 1106, a CTF compiler 1108, a code generator 1110, a JavaScript interpreter 1112, a user interface (UI) 1114, a webpage manager 1116, and several data repositories including a source code database 1120, a compiled code database 1121, a user data database 1122, and a user database 1123.

The CTF manager 1104 coordinates the operations of the CTF system 1102, including interactions with the users and the different components.

The CTF interpreter 1106 is an interpreter for CTF code, and the CTF compiler 1108 is a compiler for CTF code. Thus, the CTF syntax may be used for compilation or interpretation.

The interactive code generator 1110 is a tool that interfaces with a user device 1126 (associated with user 1128) via the UI 1114 for the generation of CTF code, such as in the example described above with reference to FIG. 1A.

The JavaScript interpreter 1112 may interact with the different modules of the CTF system 1102. In some examples, a user may utilize segments of code with CTF syntax and other segments in JavaScript, and the combination may be processed by the CTF system 1102. The webpage manager 1116 manages the interaction via web browser with user devices 1126.

The source code database 1120 stores source code created by users, such as CTF code. The compiled code database 1121 stores compiled code. The user data database 1122 stores data of users, and the user database 1123 keeps information about the users of the system.

The CTF system 1102 may also include other components, such as debuggers, text editors, an Integrated Development Environment (IDE) that includes a text editor, debugger, compiler, and other tools to help programmers develop software more efficiently, libraries, operating systems, etc.

It is noted that the examples illustrated in FIG. 11 are examples and do not describe every possible embodiment. Other embodiments may utilize different modules, combine modules, break modules into several submodules, perform the operations on a distributed system across multiple machines, etc. The embodiments illustrated in FIG. 11 should, therefore, not be interpreted to be exclusive or limiting but rather illustrative.

Figure 12:
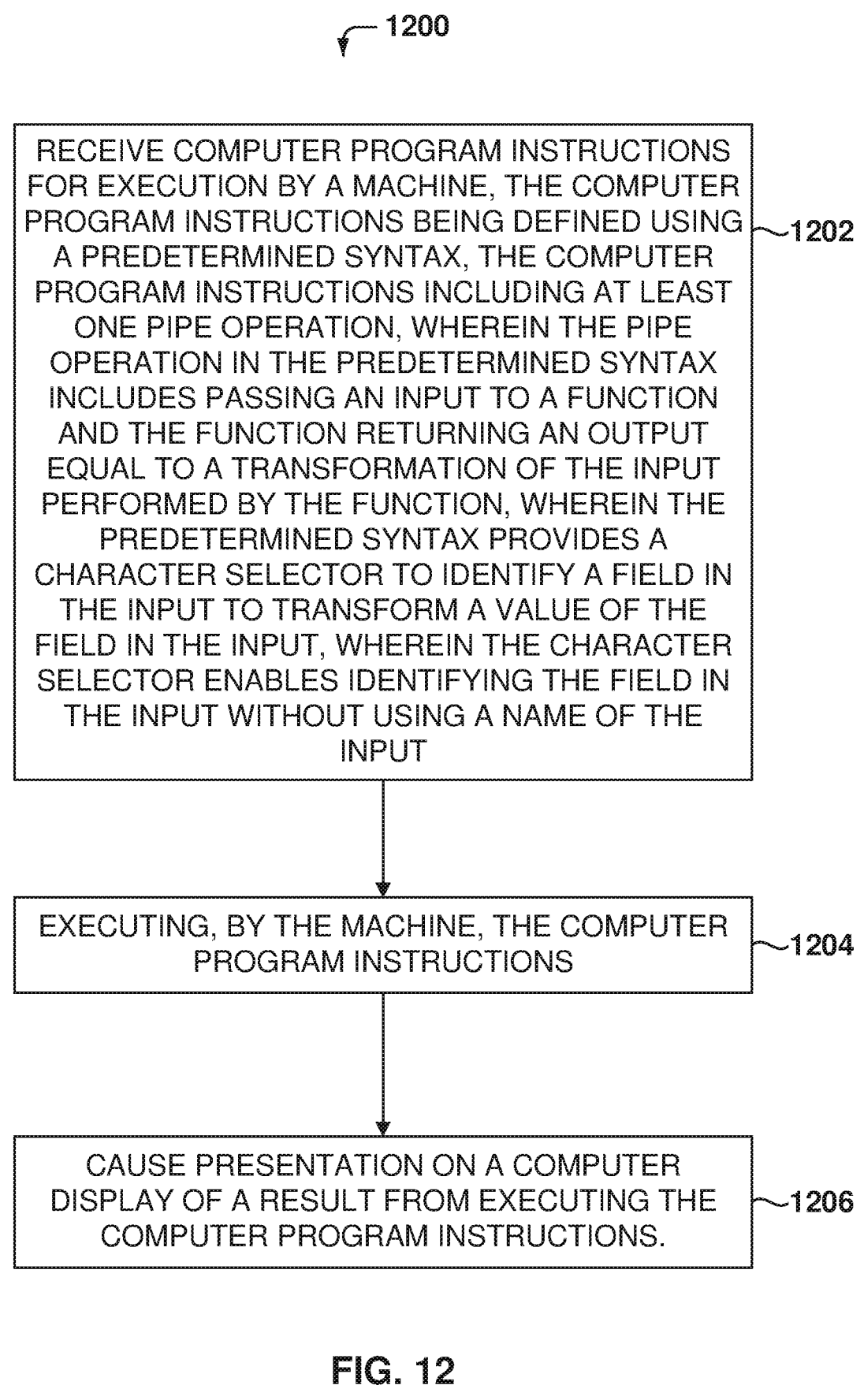

FIG. 12 is a flowchart of a method 1200 for the use of a syntax framework for data transformation, according to some examples. While the various operations in this flowchart are presented and described sequentially, one of ordinary skill will appreciate that some or all of the operations may be executed in a different order, combined, omitted, or executed in parallel.

Operation 1202 is for receiving computer program instructions for execution by a machine. The computer program instructions are defined using a predetermined syntax, and the computer program instructions include at least one pipe operation. The pipe operation in the predetermined syntax includes passing an input to a function and the function returning an output equal to a transformation of the input performed by the function. Further, the predetermined syntax provides a character selector to identify a field in the input to transform a value of the field in the input, and the character selector enables identifying the field in the input without using a name of the input.

From operation 1202, the method 1200 flows to operation 1204 to execute, by the machine, the computer program instructions.

From operation 1204, the method 1200 flows to operation 1206 for causing presentation on a computer display of a result from executing the computer program instructions.

In one example, the pipe operation does not produce the output that is unrelated to the input, where a structure of the output is equal to the structure of the input or to a transformation in the pipe operation of the structure of the input.

In one example, the output is equal to one of the input, the input after one or more values in the input are modified, or a selection of all or part of the input.

In one example, the predetermined syntax comprises a special symbol sequence to reference fields within the input, the special symbol sequence enabling field selection without specifying a name of a selected field of the input.

In one example, the predetermined syntax is configured to enable a chain of several pipe operations, where each function, after a first function of the chain, in the several pipe operations, receives the input after the input is transformed by a previous function in the chain.

In one example, the predetermined syntax comprises enabling selection of multiple fields of the input by separating the multiple fields separated by a comma.

In one example, the pipe operation is a select and transform function that selects a field of the input and assigns a new value to the selected field of the input.

In one example, the pipe operation is a nested conditional function to select one or more fields from the input based on a condition.

In one example, the pipe operation is a transformation of the input to update a field of the input with a new value.

In one example, the method 1200 further comprises providing a user interface (UI) to enter the computer program instructions.

Another general aspect is for a system that includes a memory comprising instructions and one or more computer processors. The instructions, when executed by the one or more computer processors, cause the one or more computer processors to perform operations comprising: receiving computer program instructions for execution by the one or more computer processors, the computer program instructions being defined using a predetermined syntax, the computer program instructions including at least one pipe operation, wherein the pipe operation in the predetermined syntax includes passing an input to a function and the function returning an output equal to a transformation of the input performed by the function, wherein the predetermined syntax provides a character selector to identify a field in the input to transform a value of the field in the input, wherein the character selector enables identifying the field in the input without using a name of the input; executing, execution by the one or more computer processors, the computer program instructions; and causing presentation on a computer display of a result from executing the computer program instructions.

In yet another general aspect, a non-transitory machine-readable storage medium (e.g., a non-transitory storage medium) includes instructions that, when executed by a machine, cause the machine to perform operations comprising: receiving computer program instructions for execution by a machine, the computer program instructions being defined using a predetermined syntax, the computer program instructions including at least one pipe operation, wherein the pipe operation in the predetermined syntax includes passing an input to a function and the function returning an output equal to a transformation of the input performed by the function, wherein the predetermined syntax provides a character selector to identify a field in the input to transform a value of the field in the input, wherein the character selector enables identifying the field in the input without using a name of the input; executing, by the machine, the computer program instructions; and causing presentation on a computer display of a result from executing the computer program instructions.

Figure 13:
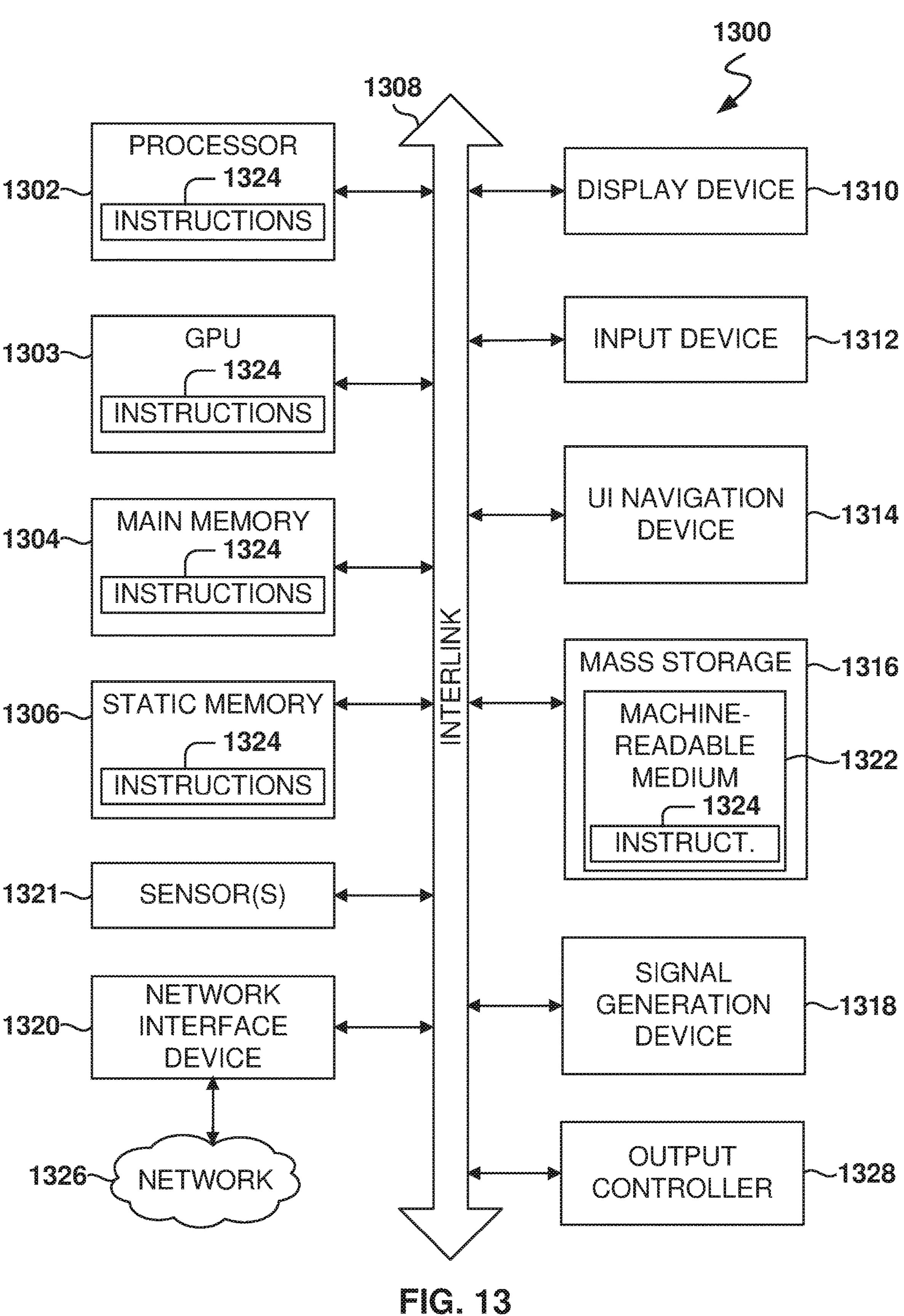
FIG. 13 is a block diagram illustrating an example of a machine upon or by which one or more example processes described herein may be implemented or controlled.

FIG. 13 is a block diagram illustrating an example of a machine 1300 upon or by which one or more example processes described herein may be implemented or controlled. In alternative embodiments, the machine 1300 may operate as a standalone device or be connected (e.g., networked) to other machines. In a networked deployment, the machine 1300 may operate in the capacity of a server machine, a client machine, or both in server-client network environments. In an example, the machine 1300 may act as a peer machine in a peer-to-peer (P2P) (or other distributed) network environment. Further, while only a single machine 1300 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, various components, or mechanisms. Circuitry is a collection of circuits implemented in tangible entities, including hardware (e.g., simple circuits, gates, logic). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits), including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other circuitry components when the device operates. In an example, any of the physical components may be used in more than one member of more than one circuitry. For example, under operation, execution units may be used in a first circuit of a first circuitry at one point in time and reused by a second circuit in the first circuitry or by a third circuit in a second circuitry at a different time.

The machine 1300 (e.g., computer system) may include a hardware processor 1302 (e.g., a central processing unit (CPU), a hardware processor core, or any combination thereof), a graphics processing unit (GPU 1303), a main memory 1304, and a static memory 1306, some or all of which may communicate with each other via an interlink 1308 (e.g., bus). The machine 1300 may further include a display device 1310, an alphanumeric input device 1312 (e.g., a keyboard), and a user interface (UI) navigation device 1314 (e.g., a mouse). In an example, the display device 1310, alphanumeric input device 1312, and UI navigation device 1314 may be a touch screen display. The machine 1300 may additionally include a mass storage device 1316 (e.g., drive unit), a signal generation device 1318 (e.g., a speaker), a network interface device 1320, and one or more sensors 1321, such as a Global Positioning System (GPS) sensor, compass, accelerometer, or another sensor. The machine 1300 may include an output controller 1328, such as a serial (e.g., universal serial bus (USB)), parallel, or other wired or wireless (e.g., infrared (IR), near field communication (NFC)) connection to communicate with or control one or more peripheral devices (e.g., a printer, card reader).

The processor 1302 refers to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor 1302 may, for example, include at least one of a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof.

The processor 1302 may further be a multi-core processor having two or more independent processors (sometimes referred to as "cores") that may execute instructions contemporaneously. Multi-core processors contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. The processor 1302 may be emulated in software, running on a physical processor, as a virtual processor or virtual circuit. The virtual processor may behave like an independent processor but is implemented in software rather than hardware.

The mass storage device 1316 may include a machine-readable medium 1322 on which one or more sets of data structures or instructions 1324 (e.g., software) embodying or utilized by any of the techniques or functions described herein. The instructions 1324 may also reside, completely or at least partially, within the main memory 1304, within the static memory 1306, within the hardware processor 1302, or the GPU 1303 during execution thereof by the machine 1300. For example, one or any combination of the hardware processor 1302, the GPU 1303, the main memory 1304, the static memory 1306, or the mass storage device 1316 may constitute machine-readable media.

While the machine-readable medium 1322 is illustrated as a single medium, the term "machine-readable medium" may include a single medium or multiple media (e.g., a centralized or distributed database and associated caches and servers) configured to store one or more instructions 1324.

The term "machine-readable medium" may include any medium that is capable of storing, encoding, or carrying instructions 1324 for execution by the machine 1300 and that causes the machine 1300 to perform any one or more of the techniques of the present disclosure or that is capable of storing, encoding, or carrying data structures used by or associated with such instructions 1324. Non-limiting machine-readable medium examples may include solid-state memories and optical and magnetic media. For example, a massed machine-readable medium comprises a machine-readable medium 1322 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1324 may be transmitted or received over a communications network 1326 using a transmission medium via the network interface device 1320.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented separately. These and other variations, modifications, additions, and improvements fall within the scope of the subject matter herein.

The examples illustrated herein are described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Additionally, as used in this disclosure, phrases of the form "at least one of an A, a B, or a C," "at least one of A, B, and C," and the like should be interpreted to select at least one from the group that comprises "A, B, and C." Unless explicitly stated otherwise in connection with a particular instance, in this disclosure, this manner of phrasing does not mean "at least one of A, at least one of B, and at least one of C." As used in this disclosure, the example "at least one of an A, a B, or a C" would cover any of the following selections: {A}, {B}, {C}, {A, B}, {A, C}, {B, C}, and {A, B, C}.

Moreover, plural instances may be provided for resources, operations, or structures described herein as a single instance. Additionally, boundaries between various resources, operations, modules, engines, and data stores are somewhat arbitrary, and particular operations are illustrated in the context of specific illustrative configurations. Other allocations of functionality are envisioned and may fall within the scope of various examples of the present disclosure. In general, structures and functionality are presented as separate resources in the example; configurations may be implemented as a combined structure or resource. Similarly, structures and functionality presented as a single resource may be implemented as separate resources. These and other variations, modifications, additions, and improvements fall within a scope of examples of the present disclosure as represented by the appended claims. Accordingly, the specification and drawings are to be regarded in an illustrative rather than a restrictive sense.

What is claimed is:

1. A computer-implemented method comprising:

receiving computer program instructions for execution by a machine, the computer program instructions being defined using a predetermined syntax, the computer program instructions including at least one pipe operation, wherein a left side of the pipe operation is an input data object and a right side of the pipe operation comprises a function to be applied to the input data object, wherein the execution of the pipe operation in the predetermined syntax includes passing the input data object to the function and the pipe operation returning an output equal to a transformation of the input data object performed by the function, wherein the predetermined syntax provides a character selector for inclusion on the right side of the pipe operation to select a field in the input data object that is passed to the function to transform a value of the selected field in the input data object, wherein the character selector enables identifying the field in the input data object without using a name of the input data object;

executing, by the machine, the computer program instructions; and causing presentation on a computer display of a result from executing the computer program instructions.

2. The method as recited in claim 1, wherein the pipe operation does not produce the output that is unrelated to the input data object, wherein a structure of the output is equal to the structure of the input data object or equal to a transformation in the pipe operation of the structure of the input data object.

3. The method as recited in claim 2, where the output is equal to one of the input data object, the input data object after one or more values in the input data object are modified, or a selection of all or part of the input data object.

4. The method as recited in claim 1, wherein the predetermined syntax comprises a special symbol sequence to reference fields within the input data object, the special symbol sequence enabling field selection without specifying a name of a selected field of the input data object.

5. The method as recited in claim 1, wherein the predetermined syntax is configured to enable a chain of several pipe operations, where each function, after a first function of the chain, in the several pipe operations, receives the input data object after the input data object is transformed by a previous function in the chain.

6. The method as recited in claim 1, wherein the predetermined syntax comprises enabling selection of multiple fields of the input data object by separating the multiple fields with a comma.

7. The method as recited in claim 1, wherein the pipe operation is a select and transform function that selects a field of the input data object and assigns a new value to the selected field of the input data object.

8. The method as recited in claim 1, wherein the pipe operation is a nested conditional function to select one or more fields from the input data object based on a condition.

9. The method as recited in claim 1, wherein the pipe operation is a transformation of the input data object to update a field of the input data object with a new value.

10. The method as recited in claim 1, further comprising:

providing a user interface (UI) to enter the computer program instructions.

11. A system comprising:

a memory comprising instructions; and one or more computer processors, wherein the instructions, when executed by the one or more computer processors, cause the system to perform operations comprising:

receiving computer program instructions for execution by a machine, the computer program instructions being defined using a predetermined syntax, the computer program instructions including at least one pipe operation, wherein a left side of the pipe operation is an input data object and a right side of the pipe operation comprises a function to be applied to the input data object, wherein the execution of the pipe operation in the predetermined syntax includes passing the input data object to the function and the pipe operation returning an output equal to a transformation of the input data object performed by the function, wherein the predetermined syntax provides a character selector for inclusion on the right side of the pipe operation to select a field in the input data object that is passed to the function to transform a value of the selected field in the input data object, wherein the character selector enables identifying the field in the input data object without using a name of the input data object;

executing, by the machine, the computer program instructions; and causing presentation on a computer display of a result from executing the computer program instructions.

12. The system as recited in claim 11, wherein the pipe operation does not produce the output that is unrelated to the input data object, wherein a structure of the output is equal to the structure of the input data object or equal to a transformation in the pipe operation of the structure of the input data object.

13. The system as recited in claim 11, wherein the predetermined syntax comprises a special symbol sequence to reference fields within the input data object, the special symbol sequence enabling field selection without specifying a name of a selected field of the input data object.

14. The system as recited in claim 11, wherein the predetermined syntax is configured to enable a chain of several pipe operations, where each function, after a first function of the chain, in the several pipe operations, receives the input data object after the input data object is transformed by a previous function in the chain.

15. The system as recited in claim 11, wherein the predetermined syntax comprises enabling selection of multiple fields of the input data object by separating the multiple fields with a comma.

16. A non-transitory machine-readable storage medium including instructions that, when executed by a machine, cause the machine to perform operations comprising:

receiving computer program instructions for execution by a machine, the computer program instructions being defined using a predetermined syntax, the computer program instructions including at least one pipe operation, wherein a left side of the pipe operation is an input data object and a right side of the pipe operation comprises a function to be applied to the input data object, wherein the execution of the pipe operation in the predetermined syntax includes passing the input data object to the function and the pipe operation returning an output equal to a transformation of the input data object performed by the function, wherein the predetermined syntax provides a character selector for inclusion on the right side of the pipe operation to select a field in the input data object that is passed to the function to transform a value of the selected field in the input data object, wherein the character selector enables identifying the field in the input data object without using a name of the input data object;

executing, by the machine, the computer program instructions; and causing presentation on a computer display of a result from executing the computer program instructions.

17. The non-transitory machine-readable storage medium as recited in claim 16, wherein the pipe operation does not produce the output that is unrelated to the input data object, wherein a structure of the output is equal to the structure of the input data object or equal to a transformation in the pipe operation of the structure of the input data object.

18. The non-transitory machine-readable storage medium as recited in claim 16, wherein the predetermined syntax comprises a special symbol sequence to reference fields within the input data object, the special symbol sequence enabling field selection without specifying a name of a selected field of the input data object.

19. The non-transitory machine-readable storage medium as recited in claim 16, wherein the predetermined syntax is configured to enable a chain of several pipe operations, where each function, after a first function of the chain, in the several pipe operations, receives the input data object after the input data object is transformed by a previous function in the chain.

20. The non-transitory machine-readable storage medium as recited in claim 16, wherein the predetermined syntax comprises enabling selection of multiple fields of the input data object by separating the multiple fields with a comma.

* * * * *